United States Patent
Parfitt

(10) Patent No.: US 6,667,705 B2
(45) Date of Patent: Dec. 23, 2003

(54) ANALOG TO DIGITAL CONVERTER THRESHOLD DETECTION CIRCUIT

(75) Inventor: Steven Perry Parfitt, Johnson City, TN (US)

(73) Assignee: Siemens Energy & Automation, Alpharetta, GA (US)

( * ) Notice: Subject to any disclaimer, the term of this patent is extended or adjusted under 35 U.S.C. 154(b) by 0 days.

(21) Appl. No.: 10/281,728

(22) Filed: Oct. 28, 2002

(65) Prior Publication Data

US 2003/0184462 A1 Oct. 2, 2003

Related U.S. Application Data

(60) Provisional application No. 60/368,419, filed on Mar. 28, 2002.

(51) Int. Cl.[7] .................................................. H03M 1/00
(52) U.S. Cl. ........................................ 341/141; 341/120
(58) Field of Search ................................ 341/141, 120, 341/121, 132

(56) References Cited

U.S. PATENT DOCUMENTS

| | | | | |
|---|---|---|---|---|
| 4,364,027 A | * | 12/1982 | Murooka | 340/347 |
| 6,047,380 A | * | 4/2000 | Nolan et al. | 713/324 |
| 6,384,753 B1 | * | 5/2002 | Brooks et al. | 341/118 |

* cited by examiner

*Primary Examiner*—Brian Young
*Assistant Examiner*—Joseph Lauture

(57) ABSTRACT

At least one exemplary embodiment of the present invention includes a device that comprises a microprocessor, a multiplexing analog-to-digital converter integral to said microprocessor, and a reference voltage source connected to said multiplexing analog-to-digital converter. At least one exemplary embodiment of the present invention includes a method that comprises obtaining a signal at a multiplexing analog-to-digital converter integral to a microprocessor; and comparing a digital value of the signal to a reference digital value. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope or meaning of the claims.

28 Claims, 2 Drawing Sheets

ANALOG TO DIGITAL CONVERTER THRESHOLD DETECTION CIRCUIT

CROSS-REFERENCE TO RELATED APPLICATIONS

This application claims priority to, and incorporates by reference herein in its entirety, the pending provisional application Ser. No. 60/368,419, filed Mar. 28, 2002.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

At least one exemplary embodiment of the present invention includes a device that comprises a microprocessor, a multiplexing analog-to-digital converter integral to said microprocessor, and a reference voltage source connected to said multiplexing analog-to-digital converter.

At least one exemplary embodiment of the present invention includes a method that comprises obtaining a signal at a multiplexing analog-to-digital converter integral to a microprocessor; and comparing a digital value of the signal to a reference digital value.

Figure 1:
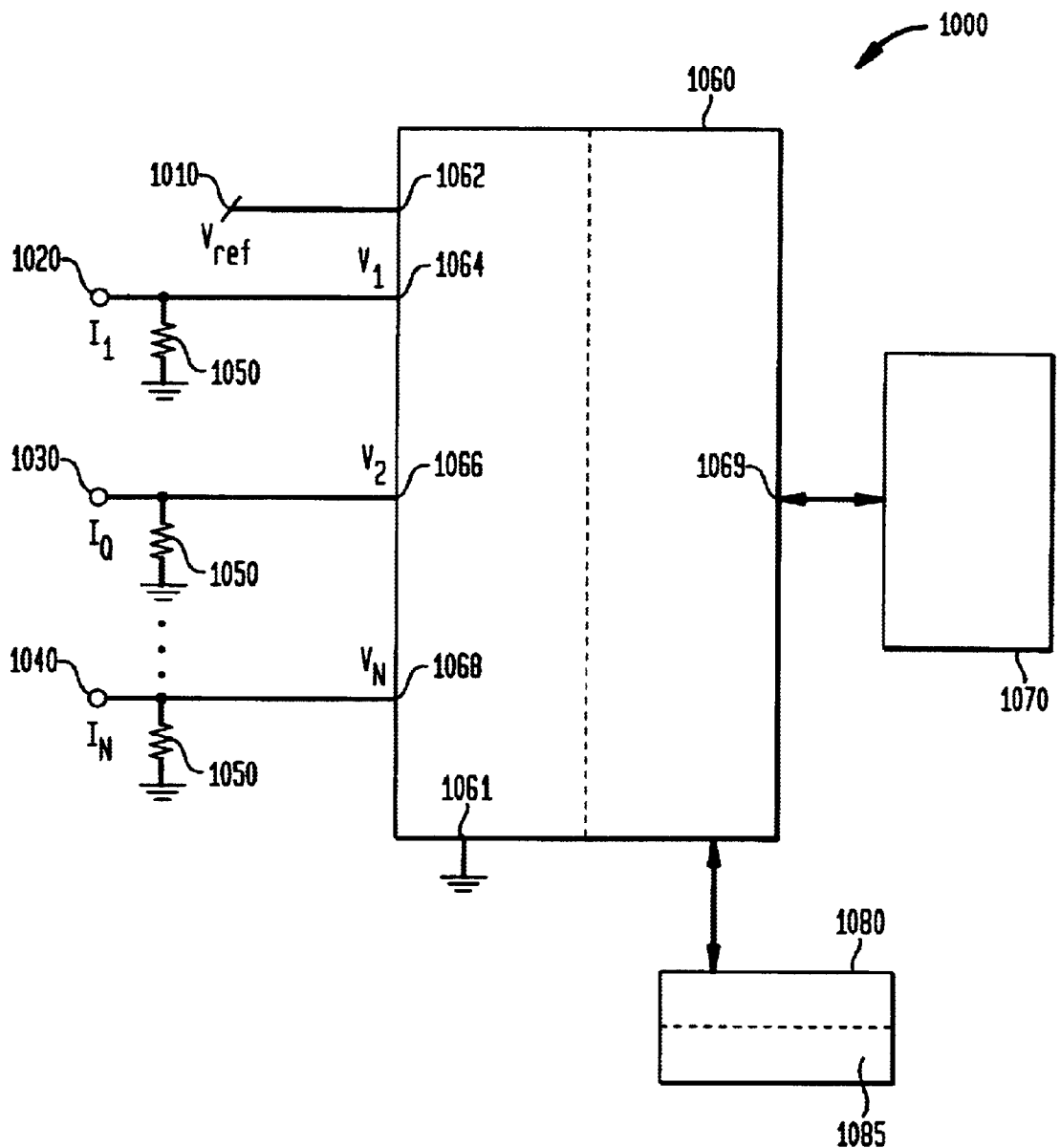
FIG. 1 is an electrical diagram of an exemplary embodiment of a system 1000 of the present invention.

FIG. 1 is an electrical diagram of an exemplary embodiment of a system 1000 of the present invention. System 1000 can include a microprocessor 1060 having an integral a multiplexing analog-to-digital converter portion 1061 to which a reference voltage source 1010 is connected to provide a reference input 1062. System 1000 can be integral to a programmable logic controller.

In one exemplary embodiment, microprocessor 1060 can be a general-purpose microprocessor, such a Pentium series microprocessor manufactured by the Intel Corporation of Santa Clara, Calif. Attached to microprocessor 1060 can be a memory 1080, which can store instructions 1085 adapted to be executed by microprocessor 1060 according to one or more activities of method 2000 (described below). Memory 1080 can be any device capable of storing analog or digital information, such as a hard disk, Random Access Memory (RAM), Read Only Memory (ROM), flash memory, memory stick, a compact disk, a magnetic tape, a floppy disk, etc., and any combination thereof. Instructions 1085 also can be embodied in software, which can take any of numerous forms that are well known in the art.

In another exemplary embodiment, microprocessor 1060 can be provided as an application-specific integrated circuit (ASIC), and can also include an integral memory portion. Thus, microprocessor 1060 can be designed to implement in its hardware and/or firmware at least a part of a method in accordance with an embodiment of the present invention.

A plurality of sensors, 1020, 1030, . . . 1040 can be connected to multiplexing analog-to-digital converter portion 1061. From first sensor 1020 can promulgate a first sensor signal defined by a current $I_1$, from second sensor 1030 can promulgate a second sensor signal defined by a current $I_2$, . . . and from Nth sensor 1040 can promulgate an Nth sensor signal defined by a current $I_N$. Each of currents $I_1, I_2, \ldots I_N$ can flow through a high precision input resistor 1050, resulting in voltages $V_1, V_2, \ldots V_N$ that characterize input signals 1064, 1066, . . . 1068 at multiplexing analog-to-digital converter portion 1061. Note that any of input signals at 1020, 1030 . . . 1040 can be transmitted by direct wire or given the appropriate conversion and communication equipment, be transmitted via any form of network, including a public switched telephone network (PSTN), a wireless network, a cellular network, a local area network, the Internet, etc.

Multiplexing analog-to-digital converter portion 1061 can receive and multiplex any number of analog input signals 1064, 1066, . . . 1068, and can convert each from an analog to a digital signal, such as by converting an analog voltage value to a digital voltage value. Microprocessor 1060 can compare a reference value, such as a reference voltage value, stored in memory 1080 (which can be integral to microprocessor 1060) to each digital value and determine a status of each sensor 1020, 1030 . . . 1040.

Microprocessor 1060 can then output a status signal 1069 to a second microprocessor 1070, such as the main processor of a programmable logic controller. Upon start-up, second microprocessor 1070 can provide reference value(s) to microprocessor 1060, which can store the reference value(s) in memory 1080.

Figure 2:
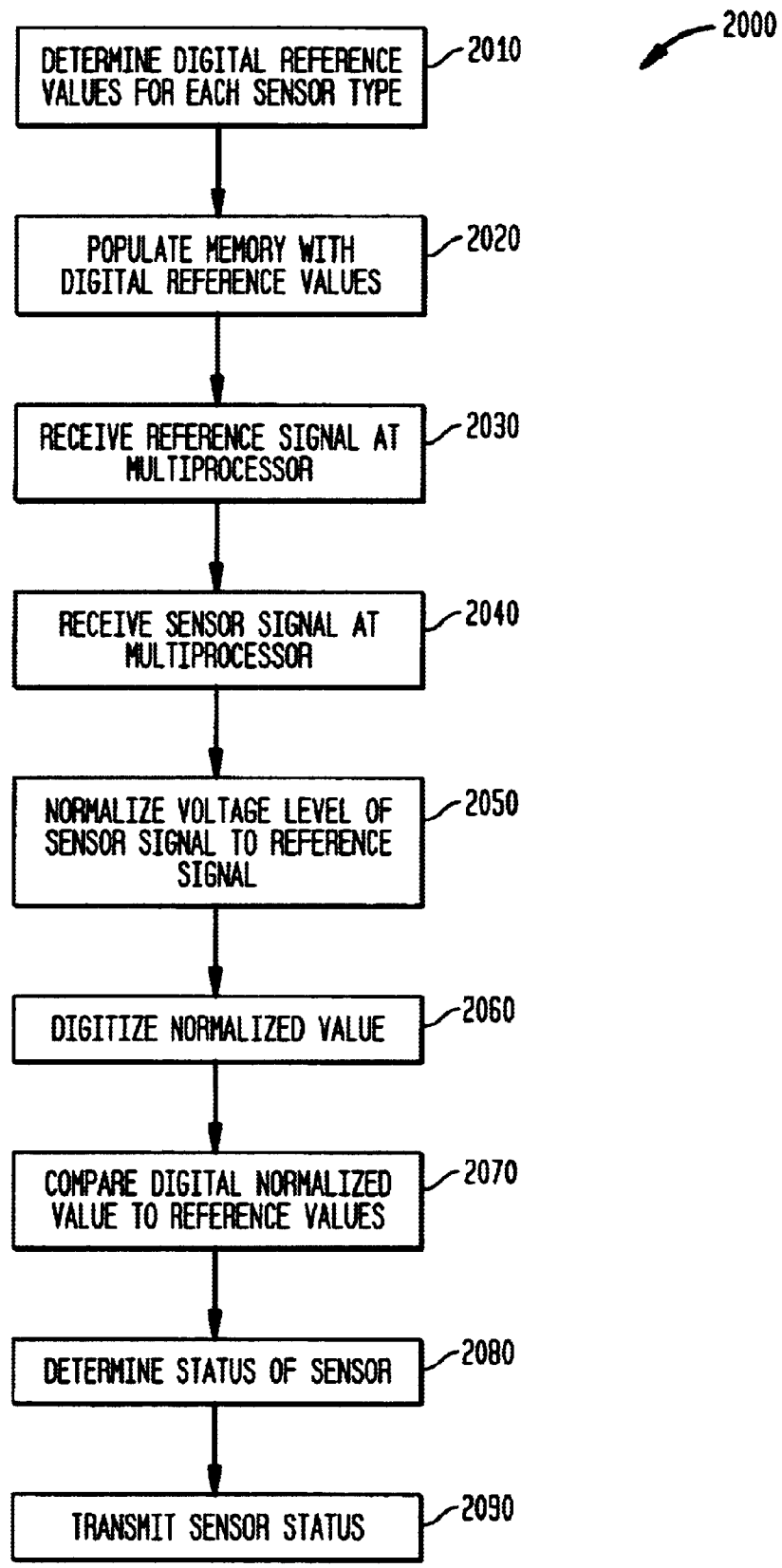
FIG. 2 is a flow diagram of an exemplary embodiment of a method 2000.

FIG. 2 is a flowchart of an exemplary embodiment of a method 2000 of the present invention. At activity 2010, for a given sensor type, a digital reference value is determined.

As an example, Table 1 provides current ranges that an illustrative sensor will produce under various conditions, such as a shorted circuit or sensor, a valid logical 1, a transition between logic states, a valid logical 0, and an open circuit. Table 1 also lists the resulting input voltages to the analog-to-digital converter if the sensor is connected to, for example, a 237 ohm precision resistor. Table 1 further lists the ratio of the resulting input voltages to a reference voltage, which in this example is 2.5 volts. Table 1 also lists a reference value expressed, for the purposes of this example, as an 8 bit (modulo 256) digital value.

TABLE 1

| Sensor Status | Current (milliamps) | Input Voltage (volts) | Ratio to reference voltage (%) | Reference value |
|---|---|---|---|---|
| Shorted | >7.0 | >1.659 | >66.4 | >169 |
| Logical 1 | 2.1–7.0 | 0.498–1.659 | 19.9–66.4 | 51–169 |
| Transition between Logical states | 1.2–2.1 | 0.284–0.498 | 11.4–19.9 | 29–51 |
| Logical 0 | 0.35–1.2 | 0.083–0.284 | 0.033–11.4 | 8–29 |
| Open (e.g., broken wire) | <0.35 | <0.083 | <0.033 | <8 |

In alternative embodiments, nearly any other resistor value could be used, but the value chosen is typically related to the reference voltage and input current. If a lower reference voltage is chosen, a smaller resistor value can be used to achieve the same range of reference values. For example, with a reference voltage of 2.5V, and a maximum input current of 10 mA, a value of 250 Ohms could be used to get a maximum input count at the maximum input current. A smaller resistor value can be chosen to allow for tolerances in the resistor, in the voltage supply that drives the sensors, and/or variations in the sensor.

As another example, other common reference voltages include 2.0V, 1.5V, and 1.25V. Other lower voltage values can be expected in the future as technology pushes for lower and lower operating voltages for both analog and digital circuitry. As a further example of possible alternative embodiments, other possible resolutions include 4 bit, 6 bit, 8 bit, 10 bit, 12, bit, 14 bit, 16 bit, and higher.

At activity 2020, a memory is populated with the digital reference values, so that the digital reference values can be looked-up when needed. At activity 2030, the multiplexing analog-to-digital converter portion of the microprocessor receives a reference signal having a reference voltage level. At activity 2040, the multiplexing analog-to-digital converter portion of the microprocessor also receives a sensor signal having a sensor voltage. The sensor voltage is the result of the sensor's output and the resistance value of the precision resistor.

At activity 2050, the sensor voltage level is normalized to the reference voltage level by dividing the sensor voltage level by the reference voltage level, to arrive at a dividend. At activity 2060, the dividend is digitized by multiplying it by the number of counts in the analog-to-digital converter. For example, if the analog-to-digital converter can output a 10-bit value, it can output a value between 0 and 1023 (=$2^{10}$−1). Thus, in this case, the dividend would be multiplied by 1023, the resulting product possibly rounded to the nearest integer, and the integer portion of the resulting product would represent the digital value of the normalized sensor voltage. Note that activities 2050 and 2060 can occur in the opposite order, such that the sensor voltage level is digitized prior to being normalized. In fact, any of activities 2010 to 2090 can occur in any appropriate order.

At activity 2070, the microprocessor can compare the digital normalized value to the digital reference values, such as those in Table 1. At activity 2080, the microprocessor can determine the status of the sensor. At activity 2090, the microprocessor can transmit the sensor status, such as to the second microprocessor, which can be part of a programmable logic controller.

Referring to the example of Table 1, if a sensor outputs 1.0 milliamp, then 0.237 volts (237 ohms×0.001 amps) is input to the multiplexing analog-to-digital converter portion of the microprocessor. That input voltage represents 9.48% ((0.237÷2.5)×100%) of the reference voltage level. Because the maximum digital value of the analog-to-digital converter is 255, the analog-to-digital converter will output a count of 24 (0.0948*255, modulo 256). When the microprocessor compares the converter's digital output to the digital reference values stored in memory (i.e., those shown in Table 1), the microprocessor determines that a logical 0 was provided by the sensor, and provides an output signal consistent with this determination. A programmable logic controller can react as programmed to the fact that a logical 0 was provided by the sensor.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A device, comprising:
   a microprocessor integral to a programmable logic controller;
   a multiplexing analog-to-digital converter integral to said microprocessor; and
   a reference voltage source connected to said multiplexing analog-to-digital converter.

2. A device, comprising:
   a microprocessor;
   a multiplexing analog-to-digital converter integral to said microprocessor; and
   a reference voltage source connected to said multiplexing analog-to-digital converter.

3. The device of claim 2, wherein said microprocessor is connected to a processor of a programmable logic controller.

4. The device of claim 2, further comprising an input signal source connected to said multiplexing analog-to-digital converter.

5. The device of claim 2, further comprising an input signal source connected to said multiplexing analog-to-digital converter via the Internet.

6. The device of claim 2, further comprising a plurality of input signal sources connected to said multiplexing analog-to-digital converter.

7. The device of claim 2, further comprising a precision resistor connected to a source of an input signal to said multiplexing analog-to-digital converter.

8. The device of claim 2, further comprising a precision resistor connected to a plurality of sources of input signals to said multiplexing analog-to-digital converter.

9. The device of claim 2, further comprising a memory containing a plurality of reference digital values, said memory integral to said microprocessor.

10. The device of claim 2, further comprising a memory containing a plurality of reference digital values, said memory connected to said microprocessor.

11. A method, comprising:
    receiving a signal at a multiplexing analog-to-digital converter integral to a microprocessor; and
    comparing a digital value of the signal to a reference digital value.

12. The method of claim 11, wherein the microprocessor is integral to a programmable logic controller.

13. The method of claim 11, wherein the signal is received via the Internet.

14. The method of claim 11, further comprising determining the reference digital value.

15. The method of claim 11, further comprising determining a plurality of reference digital values.

16. The method of claim 11, further comprising:
    dividing the digital value of the signal by the reference digital value to obtain a dividend; and
    multiplying the dividend by a maximum count of the multiplexing analog-to-digital converter to obtain a product.

17. The method of claim 11, further comprising converting a voltage level of the signal to the digital value.

18. The method of claim 11, further comprising determining a status from the signal's digital value.

19. The method of claim 11, further comprising determining from the signal's digital value whether the signal originated from an open circuit.

20. The method of claim 11, further comprising determining from the signal's digital value whether the signal originated from a shorted circuit.

21. The method of claim 11, further comprising determining from the signal's digital value whether the signal originated from a shorted sensor.

22. The method of claim 11, further comprising determining from the signal's digital value whether the signal originated from a properly attached sensor.

23. The method of claim 11, further comprising determining from the signal's digital value whether the signal originated from a properly attached sensor with a valid high logic level.

24. The method of claim 11, further comprising determining from the signal's digital value whether the signal originated from a properly attached sensor with a valid low logic level.

25. A system, comprising:
    means for obtaining a signal at a multiplexing analog-to-digital converter integral to a microprocessor; and
    means for comparing a digital value of the signal to a reference digital value.

26. A computer-readable medium containing instructions for activities comprising:
    obtaining a signal at a multiplexing analog-to-digital converter integral to a microprocessor; and
    comparing a digital value of the signal to a reference digital value.

27. The method of claim 11, further comprising determining a sensor status from the signal's digital value.

28. The method of claim 11, further comprising determining a circuit status from the signal's digital value.

* * * * *